(12) United States Patent
Wilden et al.

(10) Patent No.: US 7,975,902 B2
(45) Date of Patent: Jul. 12, 2011

(54) JOINING METHOD FOR JOINING COMPONENTS

(75) Inventors: Johannes Wilden, Simmerath (DE);
Jean Pierre Bergmann, Erfurt (DE);
Simon Jahn, Willmars (DE); Tamara Vugrin, Bremen (DE); Peter Knepper, Ganderkesee (DE)

(73) Assignee: Airbus Operations GmbH, Hamburg (DE)

( * ) Notice: Subject to any disclaimer, the term of this patent is extended or adjusted under 35 U.S.C. 154(b) by 374 days.

(21) Appl. No.: 12/112,870

(22) Filed: Apr. 30, 2008

(65) Prior Publication Data
US 2010/0038409 A1 Feb. 18, 2010

Related U.S. Application Data

(60) Provisional application No. 60/914,821, filed on Apr. 30, 2007.

(51) Int. Cl.
B23K 31/02 (2006.01)
(52) U.S. Cl. .................................. 228/234.3; 228/246
(58) Field of Classification Search .................. None
See application file for complete search history.

(56) References Cited

U.S. PATENT DOCUMENTS

| | | | | |
|---|---|---|---|---|
| 5,381,944 A * | 1/1995 | Makowiecki et al. | ..... | 228/124.5 |
| 5,902,498 A * | 5/1999 | Mistry et al. | ............. | 219/121.64 |
| 6,534,194 B2 | 3/2003 | Weihs et al. | | |
| 6,736,942 B2 | 5/2004 | Weihs et al. | | |
| 6,991,856 B2 * | 1/2006 | Weihs et al. | .................. | 428/635 |
| 7,354,659 B2 * | 4/2008 | Duckham et al. | ............. | 428/612 |
| 7,361,412 B2 * | 4/2008 | Wang et al. | .................... | 428/686 |
| 7,635,076 B2 * | 12/2009 | Duckham et al. | ............. | 228/109 |
| 7,644,854 B1 * | 1/2010 | Holmes et al. | ............. | 228/234.3 |
| 2002/0069944 A1 * | 6/2002 | Weihs et al. | .................. | 148/557 |
| 2004/0041006 A1 | 3/2004 | Masingale | | |
| 2004/0149813 A1 * | 8/2004 | Weihs et al. | .................. | 228/246 |
| 2005/0051607 A1 * | 3/2005 | Wang et al. | .................... | 228/246 |
| 2006/0219759 A1 * | 10/2006 | Duckham et al. | ........... | 228/234.3 |
| 2007/0023489 A1 * | 2/2007 | Swiston et al. | ............ | 228/262.9 |
| 2007/0235500 A1 * | 10/2007 | Suh et al. | ....................... | 228/101 |
| 2008/0063889 A1 * | 3/2008 | Duckham et al. | ............. | 428/615 |
| 2008/0093418 A1 * | 4/2008 | Weihs et al. | .................. | 228/101 |
| 2008/0110962 A1 * | 5/2008 | Saxena et al. | ............. | 228/123.1 |
| 2008/0272181 A1 * | 11/2008 | Wang et al. | ................. | 228/234.3 |
| 2008/0299410 A1 * | 12/2008 | Duckham et al. | ............. | 428/607 |
| 2008/0314735 A1 * | 12/2008 | Weihs et al. | .................. | 204/192.1 |
| 2009/0065554 A1 * | 3/2009 | Heerden et al. | .............. | 228/44.3 |
| 2009/0173626 A1 * | 7/2009 | Duckham et al. | ........ | 204/298.13 |
| 2009/0186195 A1 * | 7/2009 | Spraker et al. | ................. | 428/172 |
| 2009/0242615 A1 * | 10/2009 | Saxena et al. | ................. | 228/198 |

FOREIGN PATENT DOCUMENTS

DE 103 34 391 A1 3/2005

OTHER PUBLICATIONS

German Examination Report, German Application No. 10 2007 020 389.8-24, Jan. 26, 2011, 8 pages.

* cited by examiner

Primary Examiner — Kiley Stoner
(74) Attorney, Agent, or Firm — Fenwick & West LLP

(57) ABSTRACT

A method is provided for connecting components particularly in the field of aerospace wherein a first component is connected to a second component, comprising the following steps: arranging at least one nano- or microstructured material between the first and the second component, initiating an exothermic reaction of the nano- or microstructured material for connecting both components with each other.

10 Claims, 2 Drawing Sheets

JOINING METHOD FOR JOINING COMPONENTS

CROSS REFERENCE TO RELATED APPLICATION

This application claims the benefit under 35 U.S.C. §119(e) of U.S. Provisional Application Ser. No. 60/914,821, filed on Apr. 30, 2007, which is incorporated by reference here in its entirety.

FIELD OF THE INVENTION

The present invention relates to a joining method for joining components by means of a self-propagating reaction in nano- or microstructured materials. The invention relates to a joining method which is inter alia suitable for connecting structure elements in the field of aircraft construction. The content of U.S. Provisional Application No. 60/914,821 is herein included by cross-reference.

BACKGROUND OF THE INVENTION

To this day the joining method of riveting is predominantly used in the field of aircraft construction. Riveting is very well characterized with respect to its mechanical properties of the connection and the long-run behaviour during the life cycle of an aircraft. However, it does not fulfil the needs for weight optimization which are common in the field of light weight construction to a very high extent.

Therefore various other connection technologies have been developed and optimized to an extent so that they comply with the high security requirements which are common in the field of aviation while consistently implementing the principles of light weight construction. Hereunto belong for instance fusion welding methods like laser beam welding or electron beam welding, soldering or gluing.

However, riveting has the following drawbacks. For the inserting of the rivets boreholes are needed which implies a weaking. Moreover, drilling increases the requirements for corrosion protection. Furthermore the usage of rivets leads to an additional weight in the joint areas. Besides the apparative expenditure is high as well as the time need for the production of the joint. Beyond that extensive corrosion protection is required.

The fusion welding methods like laser beam welding, electron beam welding, et cetera have drawbacks as well. Fusion welding methods evoke a significant shape distortion due to the comparatively high heat introduction which frequently has to be corrected during the following production steps. Furthermore fusion welding methods are suitable only for metallic connections which are fusion weldable. This means they are suitable only for a small selection of the aluminium alloys which are used in aircraft construction. Further joining of two titanium components is possible only with extremely high apparative expenditure which is merely in singular cases economically profitable. Furthermore fusion welding methods require inert gases. Due to the generally high apparative expenditure which is needed for laser beam welding these methods are not suitable as a repair concept during the operation of the airplane.

Soldering also has similar drawbacks. During soldering both components to be joined have to be heated in an oven along with a solder located in the joint area up to the melting temperature of the solder. This results in a high thermal load in the components. Furthermore the apparative expenditure is high because the utilization of ovens is required. The airplane components frequently measuring several meters require accordingly sized ovens. In order to realize solder joints with very good mechanical properties high melting point solders are required, the method of hard soldering has to be applied. This leads to the fact that the components to be joined have to be brought up to the high melting temperature of the solder which generally exceeds 450° C. This makes the method unsuitable for aluminium alloys because they loose their good mechanical properties at such high temperatures. Due to the generally high apparative expenditure which is needed for soldering it is not suitable as a repair concept during the operation of the airplane as well.

Regarding to the drawbacks of gluing, glued connections are not electrically conductive. This constitutes a challenge especially to the protection against lightning stroke on airplanes. The glued connections commonly used in aviation require the exposure to raised temperatures for certain periods of time which results in a temperature stress of the components to be connected. Furthermore, the long-term durability and the temperature durability of glued connections are still subject to inquiries.

Friction stir welding has several disadvantages as well. This method is suitable only for metallic connections, especially for low melting light metal alloys from aluminium or magnesium. For joints of titanium components the apparitive expenditure rises tremendously. Friction stir welding is therefore not suitable as a repair concept during the operation of the airplane.

In the state of the art, as disclosed in DE 103 34 391, a method is known for generating connections in the field of microelectronics. In this method a reactive material and a solder is arranged between two components, wherein an exothermic reaction is caused in the reactive material by an ignition. In this exothermic reaction the solder melts and results in a connection of both parts.

However, in such a method only very small microelectronic components are connected to each other. Such a method is neither intended nor suitable for connecting big structure elements in aircraft construction like skin plates and skins respectively, stringers, formers, clips and/or comb-like formers to each other. Furthermore skins of airplanes for instance can reach dimensions of up to several meters. Also the requirements with respect to the mechanical properties of the joint in the field of microelectronics are clearly different from the requirements in the field of aircraft construction.

SUMMARY OF THE INVENTION

One object of the present invention is to provide a method which allows connecting the materials of the components simply and reliably, wherein the materials of the components can be identical or different.

Accordingly a method for connecting airplane components is provided, wherein a first component is connected to a second component, comprising the steps arranging at least one nano- or microstructured material between the first and the second component and initiating an exothermic reaction of the nano- or microstructured material for connecting both components with each other.

One basic idea of the present invention is to arrange a nano- or microstructured material between two components, wherein the nano- or microstructured material is formed in such a way that an exothermic reaction can be initiated by adding activation energy which is sufficient for connecting the components to each other.

Thus the present invention allows to connect two components in a very simple way, wherein the energy generated by the exothermic reaction is sufficient for sufficiently heating the opposing areas of the components or for briefly melting on, so as to connect those to each other. In doing so the heat introduction into the components is considerably lower than with common methods as for instance classic soldering or welding in which the components themselves are heated up strongly. Thus a distortion in the components can be substantially reduced and can even be even totally avoided, respectively. Due to the low heat introduction into the components in addition components from materials as for instance metals, compound materials as CFRP, GRP, AFRP, GLARE and HSS-GLARE can be connected to each other or to other materials. The aforementioned compound materials are usually heat-sensitive so that the method according to the present invention and its embodiments are also suitable for those materials.

According to one aspect of the invention at least one additional connecting material is arranged between the nano- or microstructutred material and one or both components. This additional connecting material can be a solder like a hard solder or a soft solder for instance. Due to the nano- or microstructured material the hard solder can also be used for connecting heat-sensitive materials as for instance aluminium or aluminium alloys because contrary to soldering according to the state of the art the particular component at large in all does not have to be heated strongly.

In a further embodiment according to the present invention the same or a different connecting material, depending on the function and on the intended use, can be arranged between the nano- or microstructured material and the particular component to be connected. That is to say that for instance on one side between the component and the nano- or microstructured material a hard solder can be arranged and on the other side a different connecting material can be arranged between the nano- or microstructured material and the other component. Thereby the connecting materials can be chosen in each case for instance depending on the material of the component to be connected.

In a further embodiment the nano- or microstructured material can comprise at least two or more layers, respectively made from at least two or more reactants, wherein the reactants are chosen in such a way that an exothermic reaction can be initiated. The nano- or microstructured material can thereby be formed as a foil. Thereby it is also conceivable that the foil does not consist homogenously of multiple alternately arranged layers but that the foil comprises areas in which other reactants and layers, respectively, are combined so as to achieve a variably sized heat amount at predetermined positions. For instance in areas of components to be connected already a comparatively small heat amount is sufficient for connecting those to each other, while in other areas a higher heat amount is necessary. Furthermore the components can also comprise areas with different materials or combinations of materials which the nano- or microstructured material can be adapted to in this manner. Optionally or alternatively the foil can also comprise areas of different thickness in order to achieve a different heat amount in the particular areas as well.

In compliance with a further embodiment according to the present invention the nano- or microstructured material consist of a mixture of particles of at least two or more reactants which are bound in a binder. Thereby the mixing ratio of the reactants is chosen in such a way that a suitable exothermic reaction for connecting two components can be achieved, so as to heat or to melt on these components in the joint area appropriately. The nano- or microstructured material can thereby have a pasty, liquid or rigid nature. The paste has the advantage over a foil which consists of multiple layers that it can be applied more easily and more selectively to a component. In contrast, a foil could be laminated onto a component, wherein folding is to be avoided.

In a further embodiment according to the present invention for instance metals are used as reactants which can form an intermetallic phase as for example aluminium, titanium, nickel, antimony and/or niobium.

In another embodiment an exothermic reaction is initiated for instance by electric energy, ultrasonic, microwaves, laser light, induction and/or ultraviolet rays.

In compliance with a further embodiment according to the present invention the nano- or microstructured material can be provided with apertures and recesses respectively and/or cavities in which the connecting material(s) and/or the material of the components to be connected can infiltrate.

In another embodiment according to the present invention the components to be connected are formed from metal, metal alloy, ceramic material, glas and/or compound material, wherein the compound material as for instance CFRP, GRP, AFRP, GLARE and/or HSS-GLARE.

BRIEF DESCRIPTION OF THE DRAWINGS

In the following the invention is specified by means of embodiments with reference to the accompanied figures of the drawing.

The figures illustrate.

In the figures equal reference signs identify equal or functionally equal components as far as nothing contrary is indicated.

In principle two embodiments of the method according to the present invention of joining by exothermic self-propagating reactions in nano- or microstructured components are possible.

In a first embodiment of the method according to the present invention a connecting material as for instance solder is arranged between the nano- or microstructured material and the components to be connected.

In a second embodiment of the method according to the present invention no connecting material is arranged between the nano- or microstructured material and the components to be connected but the nano- or microstructured material is arranged directly between the components to be connected.

DETAILED DESCRIPTION OF THE INVENTION

Figure 1:
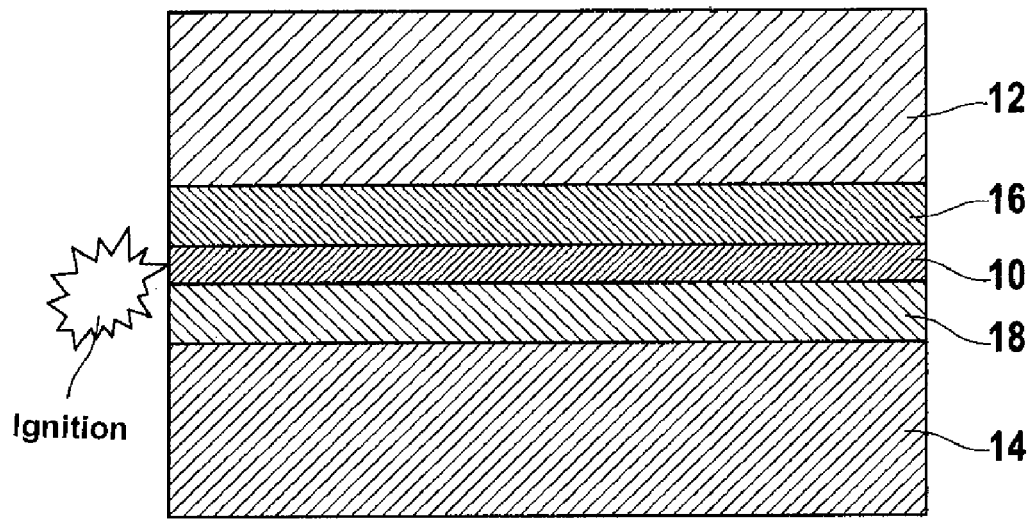
FIG. 1 a schematic view of a first embodiment of the method according to the present invention.

In FIG. 1 the first embodiment according to the present invention is schematically shown in a simplified manner. In the first embodiment according to the present invention, wherein connecting material 16, 18 as for instance solder is used for the joining, the nano- or microstructured material 10 is laid between the components 12, 14 to be joined and an intermediate layer of connecting material 16, 18 is inserted between the joining material and the components 12, 14.

Hereupon a self-propagating, exothermic chemical reaction is initiated in the reactive nano- or microstructured material 10. This is achieved by adding activation energy to the nano- or microstructured material 10.

This can happen in a very versatile manner. Some examples are listed exemplarily. For instance the activation energy can be derived from an electric energy source which for instance comprises a voltage source and a current source respectively. For example a battery can be used as electric energy source. Furthermore a laser beam source and the corresponding laser beam(s) respectively can be used for supplying activation energy. In addition it is conceivable to supply the activation energy via ultrasonic, wherein friction and thus heat is generated by the ultrasonic. Furthermore it is also conceivable to supply the activation energy via a microwave source or via a light source as heat source. The supply of activation energy via induction is also possible.

Basically the activation energy can also be supplied via an oven. This enumeration is merely exemplary and not restrictive. It serves only to show some possibilities of how to supply the corresponding activation energy to the nano- or microstructured material 10. However, the average person skilled in the art is familiar with a multitude of further possibilities of how to supply activation energy.

Once initiated, the heat which is released during this reaction is used for melting up or heating the connecting material and/or the components, whereupon the joint is realized.

If for example solder is used as connecting material it melts up due to the reaction heat and solidifies once again, whereby the connection of the components is realized. However, in doing so, the solder can melt up only for a short time without intensely heating the components to be connected. In contrast to the previous joining of components by soldering, as described with reference to the state of the art, components can thereby be connected to each other, which may not be heated as intensely as it was the case in the previous soldering.

It is also possible that solely the connecting material is heated and the whole assembly is connected to each other by pressure being applied from outside that is the components, the connecting material in between and the nano- or microstructured material.

The connecting material, for instance a solder as hard solder or soft solder is chosen in such a way, that it adheres to the material of the component and to the chemical products of the nano- or microstructured material being utilized. However, besides the aforementioned solders other connecting materials can also be utilized, for instance if components comprise a compound material as CFRP, GRP, GLARE, et cetera. In general a multitude of suitable materials are conceivable as connecting material besides the application of solder. The invention is not restricted to the utilization of solder as connecting material.

The connecting materials on both sides of the joint do not have to be the same; generally two different connecting materials are possible. For instance two different solders or other differing connecting materials or combinations thereof can be used.

The nano- or microstructured material 10 does not have to be arranged in stratified layers, all other arrangements are possible as long as it is ensured, that the self-propagating reaction passes through the nano- or microstructured material.

Due to the design of the nano- or microstructured material 10 the heat amount which is necessary for the joining is adjusted.

It is possible to join every combination of components with each other. There are no restrictions regarding the type of materials be connected. This holds for all embodiments of the invention.

That is to say, that for instance different components from metal, metal alloy, ceramic materials and/or compound materials as CFRP, GRP, AFRP, GLARE, HSS-GLARE, et cetera can be connected to each other, wherein the components can comprise they same material or can be made from different materials. The enumeration of the aforementioned materials is thereby purely exemplary and not restrictive. This applies particularly to the enumeration of the examples of compound materials.

Figure 2:
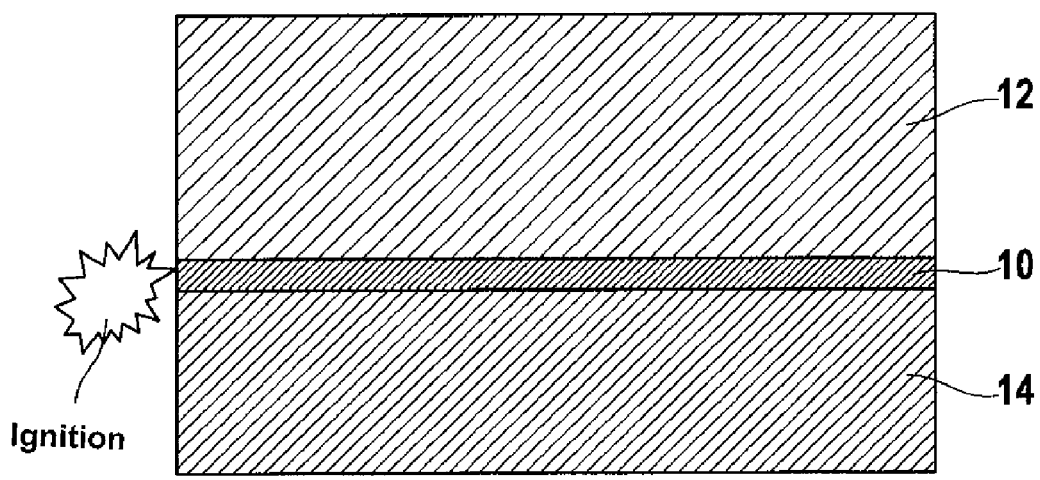
FIG. 2 a schematic view of a second embodiment of the method according to the present invention.

In FIG. 2 the second embodiment according to the present invention is schematically shown in a simplified manner. The second embodiment of the joining method according to the present invention does not include the application of connecting material 16, 18. Here the nano- or microstructured material 10 is positioned between the components to be joined 12, 14, wherein the nano- or microstructured material can be formed for instance as at least one foil or as a paste. As in the first embodiment the self-propagating, exothermic chemical reaction is initiated by the provision of activation energy. The provision of activation energy can be carried out according to the examples as described with reference to the first embodiment. However, the second embodiment is not restricted to these examples.

The heat being released during the reaction heats the components 12, 14 until they are plastically malleable at least in a surface layer close to the joint area or until this surface layer close to the joint area surface-melts. During the cool off and the solidification respectively of the surface layer of the components 12, 14 the connection is realized. In this case the connection method is similar to a welding process.

The nano- or microstructured materials 10 of the first and the second embodiment of the method according to the present invention consist of reactants 20, 22 which react with each other in a self-propagating, exothermic chemical reaction if activation energy is introduced. For example the nano- or microstructured materials 10 can be metallic educts as for instance aluminium or titanium, which react to an intermetallic phase, in this case TiAl, Ti3Al or TiAl3, et cetera. These are only examples for a multitude of nano- or microstructured materials 10. Optionally also nickel, antimony and niobium as well as other metals can be used for instance.

The enumeration is here not restrictive. For an average person skilled in the art it is apparent that there is a multitude of further nano- or microstructured materials.

Thereby the self-propagating exothermic reaction does not have gaseous educts or products. Also a liquid phase is not possible on the product side though it is possible on the educt side.

The self-propagating chemical reaction underlies a diffusion process of the participating reactants 20, 22. Here the nano- or microstructure of the joint material 10 determines the diffusion distances of the partners reacting with each other.

Two or more reactants can be involved in the self-prooagating reaction. An arbitrary number of products can result from the chemical reaction.

Any arrangement of the chemical educts in the nano- or microstructured material 10 which ensures the self-propagation of the chemical reaction is possible. That is to say that in this material a high degree of mixing of the chemical educts or also a high degree of order by arranging the educts can be existent.

Figure 3:
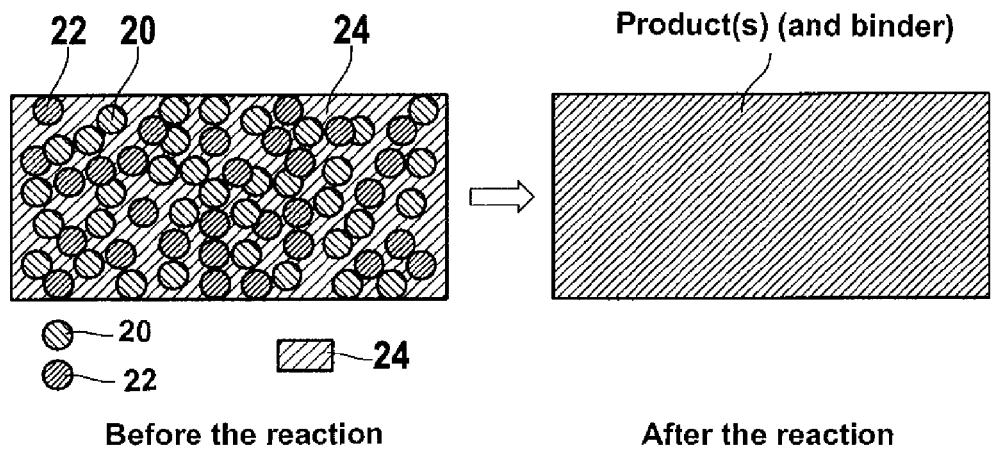
FIG. 3 a schematic view of the structure of an example for a nano- or microstructured material with a high degree of mixing.

For instance the nano- or microstructured material 10 can be in the form of a paste which is an example for a high degree of mixing as shown in FIG. 3.

Figure 4:
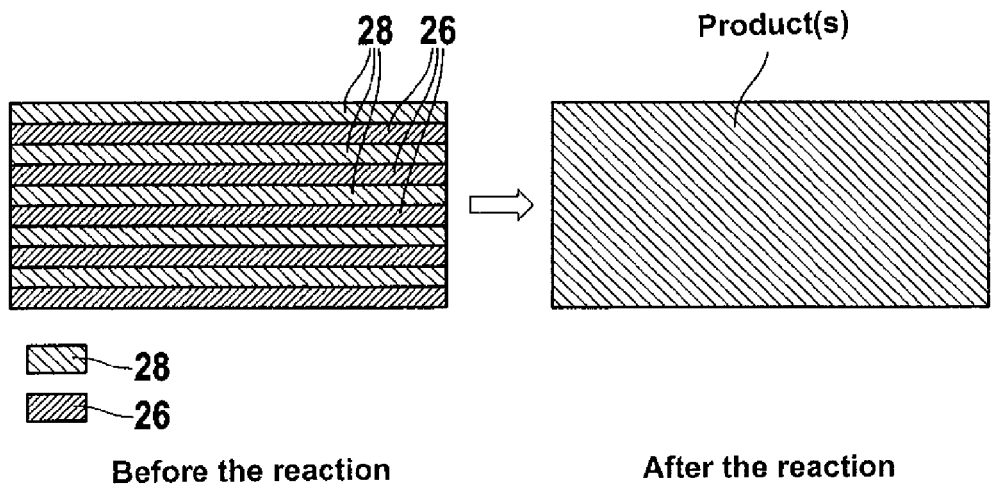
FIG. 4 a schematic view of the structure of a further example for a nano- or microstructured material with a high degree of order.

Alternatively the nano- or microstructured material 10 can also be in a layer structure which is an example for a high degree of order of the arrangement of the educts as shown in FIG. 4. In general also a combination of the nano- or microstructured material 10 according to FIG. 3 and FIG. 4 is conceivable.

FIG. 3 shows an example for an arrangement with a high degree of mixing of the chemical educts in the nano- or microstructured joint material 10. Thereby the state is schematically shown before and after the chemical reaction.

The particle size of the reactants 20, 22 lies in the nanometer or micrometer range and is connected by a binder 24 in this example, the joint material is for instance in form of a paste. The binder 24 can be solid as well as liquid and serves at first to make the paste manageable for the joining process. The reactants 20, 22 can be arranged within the binder 24 in any possible distribution which ensures the self-propagation of the chemical reaction. As shown in FIG. 3 two reactants 20, 22 or arbitrarily many reactants can be used, depending on the function and on the intended use. The binder 24 can but does not have to be involved in the self-propagating chemical reaction. The binder 24 can but does not have to be used as connecting material for the joint as described in the first embodiment of the method according to the present invention.

FIG. 4 shows another possible arrangement of the reactants 20, 22 in the nano- or microstructured material. It is shown schematically the state before and after the chemical reaction.

FIG. 4 shows thereby an example for the structure with a high degree of order of the arrangement of the chemical educts; in this case a layer structure 26, 28 of the reactants 20, 22 is provided.

The joint material 10 can be present for instance in form of a foil. The thickness of the single layers 26, 28 can be selected arbitrarily however it lies in the range of nanometers or micrometers. In this example only two reactants 20, 22 are listed, however there can be more than two and arbitrarily many respectively depending on the function and on the intended use. The educts can react to one or more products. Thereby the foil and the layers 26, 28, respectively can be formed in such a way that various areas with different heat generation can be provided. Thus different areas with different layers or different combinations of layers can be provided. Selectively the layers can also comprise different thicknesses. In so doing for instance the nano- or microstructured material can be adapted to components which comprise different materials or combinations of materials and/or tensions in the components can be reduced.

FIGS. 3 and 4 show different examples for possible arrangements of the chemicals educts in the nano- or microstructured material 10. Any other occurrence of high or low degree of order, high or low degree of mixing which ensure a self-propagation of the exothermic reaction is possible.

Some of the essential advantages of the present invention are as follows. Only the amount of heat which is required for the joining is released in the joint area. The amount of heat can be precisely adjusted by the design of the utilized nano- or microstructured joint material whereby every joint can be optimized precisely. Releasing the heat in the joint area locally results in a minimal up to no temperature stress to the components to be connected. Through this distortions are minimized and completely avoided respectively.

Thereby parameters as the speed, the heat and/or the temperature of the reaction of the reactive material that is of the nano- or microstructured material 10 can be controlled for instance by varying the thickness of the layers 26, 28 of the nano- or microstructured material 10 and/or the particular composition of the layers 26, 28 and/or the combination of theses layer 26, 28. Thereby each of the layers 26, 28 does not have to consist of a first and a second reactant respectively. In general different layers of reactants can be combined with each other, thereby arbitrarily many reactants can be combined with each other, depending on the function and on the intended use. These are merely examples of what a design may look like so as to be able to control the required heat amount of the nano- or microstructured material. The invention is thereby not restricted to these examples.

Further on the nano- or microstructured material can also be provided with variable thicknesses or persistent apertures and recesses, respectively and/or cavities in which for instance connecting material 16, 18 or material of the components 12, 14 to be connected can infiltrate so as to strengthen the adhesion for example.

As already mentioned there is no restriction with regard to material to be joined, all desired combinations of materials are possible. The method is suitable for metallic connections, congenial and uncongenial, as wells as for joints of metals with compound materials as for instance GLARE or CFRP, for joints of compound materials with each other as for instance CFRP+CFRP, CFRP+GLARE, GLARE+GLARE, et cetera. The compound materials are here only exemplary mentioned. Basically all types of compound materials can be connected to each other, as well as metal and ceramic materials, et cetera are connected.

The apparative expenditure in the method according to the present invention and in its embodiments is small as compared with the classic soldering and fusion welding methods. From this follows that as a replacement for previously riveted connections the components can be mounted considerably simpler and from only one side. Ovens are not necessarily required because the method takes place under ambient atmosphere and under ambient temperature. Furthermore no inert gases are required. The expenditure of time is low because the speed of the self-propagating reaction is very fast and the joint can therefore be accomplished in a short time. The method is not only, but also outstandingly suitable as repair concept because it can be carried out anywhere and in a very simple manner.

Although the present invention has been described by means of preferred embodiments it is not restricted thereto, but is modifiable in a versatile fashion.

Thus both embodiments of the method according to the present invention can be combined with each other particularly single features thereof. For instance as shown in FIG. 2 an arrangement can be provided wherein a nano- or microstructured material 10 is provided between two components 12, 14 to be connected. Thereby additionally on a side between the nano- or microstructured material 10 and one of both components 12, 14 an additional connecting material 16 or 18 such as a solder can be provided, comparable to the illustration in FIG. 1.

In compliance with the method according to the present invention components can be connected to each other in a very simple way. Thus relating to the aircraft construction for instance skin plates can be connected among each other and/or skin plates can be connected with stringers, formers, clips and/or comb-like formers. Elements as clips, stringers, formers and comb-like formers can also be connected to each other by means of the method according to the present invention. The method can also be used for connecting components which measure several meters. Furthermore the previously mentioned parts can be made from the same material or from different material and can be connected to each other.

What is claimed is:

1. A method for connecting aerospace components comprising the following steps:

providing a first component and a second component;

arranging a nano- or microstructured foil comprised of a plurality of layers between the first and second components, the foil including a plurality of areas with differing exothermic reactions, at least two of the areas with differing exothermic reactions having the foil in the areas; and initiating an exothermic reaction of the foil for connecting both components with each other.

2. The method according to claim 1, wherein at least one connecting material is arranged between said foil and at least one of said components.

3. The method according to claim 2, wherein a first connecting material is arranged between the foil and the first component and a second connecting material is arranged between the foil and the second component, the first and second connecting materials being formed differently from each other.

4. The method according to claim 2, wherein the at least one connecting material comprises a solder.

5. The method according to claim 1, wherein adjacent layers in the foil are made of differing reactants, the reactants chosen in such a way that an exothermic reaction can be initiated.

6. The method according to claim 1, wherein said areas with differing exothermic reactions differ by at least one of reactants in the areas, combinations of reactants in the areas, concentrations of reactants in the areas, and thickness of the layers in the areas.

7. The method according to claim 5, wherein the reactants comprise metals or metal compounds which can form an intermetallic phase like aluminium, titanium, nickel, niobium and/or antimony.

8. The method according to claim 1, wherein an exothermic reaction is initiated by at least one of electric energy, supersonic, microwaves, laser light, induction and ultraviolet rays.

9. The method according to claim 1, wherein said foil comprises at least one of apertures and cavities in which at least one of the connecting material and material of the components can infiltrate.

10. The method according to claim 1, wherein the components comprise at least one of metal, metal alloy, ceramic material, glass and compound material.

* * * * *